United States Patent
Pitt

(10) Patent No.: US 10,648,344 B2
(45) Date of Patent: May 12, 2020

(54) VANE COOLING SYSTEM

(71) Applicant: ROLLS-ROYCE plc, London (GB)

(72) Inventor: Simon Pitt, Derby (GB)

(73) Assignee: Rolls-Royce PLC, London (GB)

( * ) Notice: Subject to any disclaimer, the term of this patent is extended or adjusted under 35 U.S.C. 154(b) by 124 days.

(21) Appl. No.: 15/945,755

(22) Filed: Apr. 5, 2018

(65) Prior Publication Data

US 2018/0291747 A1    Oct. 11, 2018

(30) Foreign Application Priority Data

Apr. 6, 2017    (GB) .................................. 1705553.4

(51) Int. Cl.
*F01D 5/18*    (2006.01)
*F01D 25/12*    (2006.01)
(Continued)

(52) U.S. Cl.
CPC ............. *F01D 5/186* (2013.01); *F01D 9/041* (2013.01); *F01D 9/065* (2013.01); *F01D 11/10* (2013.01); *F01D 11/24* (2013.01); *F01D 25/12* (2013.01); *F02C 7/18* (2013.01); *F05D 2240/11* (2013.01); *F05D 2240/81* (2013.01); *F05D 2260/201* (2013.01); *F05D 2260/202* (2013.01);
(Continued)

(58) Field of Classification Search
CPC . F01D 5/188; F01D 5/189; F01D 9/02; F01D 9/023; F01D 9/041; F01D 9/06; F01D 9/065; F01D 25/12; F05D 2220/32; F05D 2220/323; F05D 2240/12; F05D 2260/201; Y02T 50/675
See application file for complete search history.

(56) References Cited

U.S. PATENT DOCUMENTS

| | | |
|---|---|---|
| 5,498,126 A | 3/1996 | Pighetti et al. |
| 6,779,967 B2 | 8/2004 | Friedl et al. |
| (Continued) | | |

FOREIGN PATENT DOCUMENTS

| | | |
|---|---|---|
| EP | 1921292 | 5/2008 |
| WO | 2014105515 | 7/2014 |

OTHER PUBLICATIONS

Great Britain Search Report dated Sep. 22, 2017, issued in GB Patent Application No. 1705553.4.

*Primary Examiner* — David E Sosnowski
*Assistant Examiner* — Sang K Kim
(74) *Attorney, Agent, or Firm* — Simpson & Simpson, PLLC

(57) ABSTRACT

A vane cooling system for a gas turbine engine comprises a vane (20a) arranged on a stator and having a chamber (27,28) extending continuously from a radially inner end to a radially outer end of the vane. The vane (20a) has a first inlet (41) and a second inlet (42). A first cooling fluid feed (54) in communication with the first inlet (41) and a second cooling fluid feed (43) in communication with the second inlet (42). The first cooling fluid feed (54) has a higher pressure than the second cooling fluid feed (43). A flow adjustment device (45) is arranged for adjusting a flow of the second cooling fluid feed (43) into the second inlet (42). The chamber is divided by a restrictor plate (25, 26) to provide an inner chamber (27) and a wall-side chamber (28) bordering the inner chamber (27). The first inlet (41) enters the wall-side chamber (28) and the second inlet (42) enters the central chamber (27).

19 Claims, 7 Drawing Sheets

(51) Int. Cl.
  *F01D 11/10*   (2006.01)
  *F01D 9/06*    (2006.01)
  *F02C 7/18*    (2006.01)
  *F01D 11/24*   (2006.01)
  *F01D 9/04*    (2006.01)

(52) U.S. Cl.
  CPC .... *F05D 2260/205* (2013.01); *F05D 2260/60* (2013.01); *Y02T 50/676* (2013.01)

(56) References Cited

U.S. PATENT DOCUMENTS

| | | | |
|---|---|---|---|
| 2003/0161719 A1* | 8/2003 | Friedl | F02C 7/12 |
| | | | 415/116 |
| 2008/0112791 A1* | 5/2008 | Lee | F01D 9/065 |
| | | | 415/58.4 |
| 2009/0293495 A1 | 12/2009 | Correia et al. | |
| 2014/0093379 A1* | 4/2014 | Tibbott | F01D 5/189 |
| | | | 416/224 |
| 2017/0234144 A1* | 8/2017 | Mugglestone | F01D 5/188 |
| | | | 415/178 |
| 2019/0032493 A1* | 1/2019 | Barker | F01D 5/186 |

* cited by examiner

VANE COOLING SYSTEM

CROSS-REFERENCE TO RELATED APPLICATIONS

This application is based upon and claims the benefit of priority from British Patent Application Number 1705553.4 filed 6 Apr. 2017, the entire contents of which are incorporated by reference.

FIELD OF THE DISCLOSURE

The present disclosure is concerned with the cooling of vanes in a gas turbine engine. More particularly, the present disclosure is concerned with cooling vanes by introducing cooling air into a cavity within the vane during operation of the gas turbine engine, where the cooling air is drawn from a supply present within the operating engine.

BACKGROUND

Vanes are commonly arranged in a circumferential array spanning an annulus through which a working fluid is directed. A vane typically comprises an aerofoil with a pressure side wall and a suction side wall which meet one another at a leading edge and a trailing edge. The pressure and suction side walls border a central chamber into which cooling air may be delivered through a radially directed inlet. An array of outlets is commonly provided adjacent the trailing edge of the vane, typically on the pressure surface side. The outlets are directed to deliver spent cooling air into the main working fluid flow which is directed over the pressure side wall and suction side wall.

The provision of air systems, in particular cooling-air systems for gas turbine engines, is known. Often, such systems when provided for cooling purposes in the hot section of the engine are dimensioned or designed such that they give adequate cooling under the most adverse conditions, for example at maximum power and the associated highest temperature ranges. Commonly, the source of cooling air is air taken off from the compressor.

During different operating conditions, the temperature of the hot section varies and can often be below the highest experienced. Consequently, non-adaptive cooling systems can result in excessive air mass flow and overcooling under operating conditions requiring lesser cooling. A larger air mass than is needed is supplied to the turbine and subsequently exhausted. Where the cooling air is sourced from the compressor, the efficiency of the engine is compromised leading to increased specific fuel consumption and in the case of aircraft powered by such engines, the range of the aircraft may be reduced.

Prior published U.S. Pat. No. 6,779,967B2 seeks to address the described limitations by introducing adaptive valve control. An embodiment described in U.S. Pat. No. 6,779,967B2 is reproduced in FIG. 1.

FIG. 1 shows, in highly simplified representation, a side view of a partial area of an aircraft gas turbine. A combustion chamber is here indicated by the reference numeral 7. A downstream turbine features a turbine casing 8 within which stator vanes 9 of a first stage and rotor blades 10 of the first stage are shown. The rotor blades 10 are attached to a rotor disk 11 of the first stage in conventional manner. Further in the downstream direction, a stator vane 12 of a second stage is shown which is associated with a rotor blade 13 of the second stage, this rotor blade 13 again being attached to a rotor disk 14 of the second stage. Reference numeral 15 indicates a turbine exit guide vane.

FIG. 1 further shows, in highly simplified form, a piston-cylinder unit 4 which is a part of an embodiment of the device for air mass flow control according to the present disclosure. The piston-cylinder unit 4 is located in the area of an inlet duct 1, exposed to a cooling air flow, with flow in the inlet duct issuing into an air duct 2 branching off from the inlet duct 1. The inlet duct 1 and air duct 2 may, for example, be used for ducting air from the cooling air flow to cool the stator vanes 9 or 12, respectively.

In the downstream direction, a counter-pressure duct 3 is provided by which pressure, for instance, from the turbine section of the engine, is applied to the rearward area of the piston 5 of the piston-cylinder unit 4. Furthermore, the piston-cylinder unit 4 comprises a spring 16 by which a suitable pre-load is applied to the piston 5 to bias the piston in the desired direction.

During operations with a high pressure difference, the pressure force in the inlet duct 1 exceeds the sum of the pressure force in the counter-pressure duct and of the pre-load force of the spring 16. The piston 5 is accordingly displaced such that the flow area of the air duct 2 is cleared. During operations with a low pressure difference, the pressure force in the counter-pressure duct 3, together with the pre-load force applied by the spring 16, exceeds the pressure force in the inlet duct 1, with the effect that the piston 5 is displaced to partly cover the free cross-section of the air duct 2, thus reducing the supply of air.

The present disclosure seeks further to make efficient use of air flows for the purposes of cooling vanes.

SUMMARY

In accordance with the present disclosure there is provided a vane cooling system for a gas turbine engine. The system includes a vane arranged on a stator and having a chamber extending continuously from a radially inner end to a radially outer end of the vane. The vane has a first inlet and a second inlet. The system includes a first cooling fluid feed in communication with the first inlet, and a second cooling fluid feed in communication with the second inlet. The first cooling fluid feed has a higher pressure and temperature than the second cooling fluid feed. The system includes a flow adjustment device arranged for adjusting a flow of the second cooling fluid feed into the second inlet. The chamber is divided by a restrictor plate to provide an inner chamber and a wall-side chamber bordering the inner chamber, the first inlet enters the wall-side chamber and the second inlet enters the central chamber.

For example, the first inlet may be arranged at a radially inner end of the vane. The second inlet may be arranged at a radially outer end of the vane.

At lower power operation, the vane is cooled by cooling fluid from the first cooling fluid feed. The pressure and temperature of this feed may be optimized for a known low power operating condition of the engine. For example, this may be a cruising condition. When the engine is operating at this known condition, the flow adjustment device may be closed. During operations which require higher power (and so increased cooling effort), the flow adjustment device may be adjusted to introduce a top-up of cooling fluid from the second cooling fluid feed.

The vane may be provided with multiple outlets for the cooling fluid. The outlets may be provided as an array of holes. For example, the array of holes is arranged along or adjacent a trailing edge of the vane. The outlets may be configured to direct the spent cooling fluid into a working fluid passing through an annulus in which the vane sits.

The vane may have an aerofoil shape in cross-section, the aerofoil shape defined by a pressure side wall and a suction side wall which meet one another at a leading edge and a trailing edge. The restrictor plate may extend from a trailing edge end of the pressure side wall spaced from but substantially in parallel alignment with the suction side wall, turn in parallel with the leading edge and continue to extend spaced from but substantially in parallel alignment with the pressure side wall to intercept itself, whereby to form an outer perimeter of the inner chamber and an inner perimeter of the wall-side chamber.

The restrictor plate is configured to permit a restricted flow of air between the inner chamber and the wall-side chamber. The restrictor plate may be perforated with a number of through-holes. The total cross-section of the through-holes may be selected to restrict a flow of air passing between the chambers.

The restrictor plate may comprise a different material than the pressure side wall and the suction side wall. For example, the restrictor plate may be bonded to the pressure side wall using a cast bonding method.

The first and second cooling fluid feeds may tap cooling air from the compressor of a gas turbine engine in which the vane cooling system is incorporated. The first and second cooling fluids may tap air from the same location on the compressor or different locations on the compressor. For example, the first and/or second cooling fluid feeds tap off upstream of the outlet guide vane (OGV) of the compressor.

One or both inlets may be obstructed by a flow restrictor, the flow restrictor configured to control the pressure of fluid passing into the chamber.

The flow adjustment device may have a simple open-closed configuration. Alternatively, the flow adjustment device may be variable to provide a variable range of flow settings when open as well as an optional closed setting.

Between vanes, the axially extending annular cavity may be defined by the radially outer casing and a segmented annular blade ring. Within an engine, the segmented annular blade ring sits radially adjacent tips of rotating blades of a rotor arranged axially adjacent the stator. Segments of the annular blade ring may be suspended from a radially inner surface of the radially outer casing, for example by means of segment hooks. The segments may define one or more radially inwardly directed gaps through which cooling fluid may pass from the axially extending annular cavity into an annulus in which the vane is located.

In some embodiments, the segments and adjacent radially outer casing may be configured to maintain a constant pressure in the axially extending annular cavity when cooling air enters the radially outer inlet. In an option, this may be achieved by dividing the annular space bounded by the casing and the segment into multiple cavities each in fluid communication. Entry and exit holes connecting the cavities may be proportioned to balance pressures within the axially extending annular cavity. Such an arrangement can discourage seal leakage to beneficially direct more cooling fluid to surfaces in need of cooling.

BRIEF DESCRIPTION OF DRAWINGS

Embodiments of the present disclosure will now be described with reference to the accompanying Figures in which.

DETAILED DESCRIPTION

Figure 1:
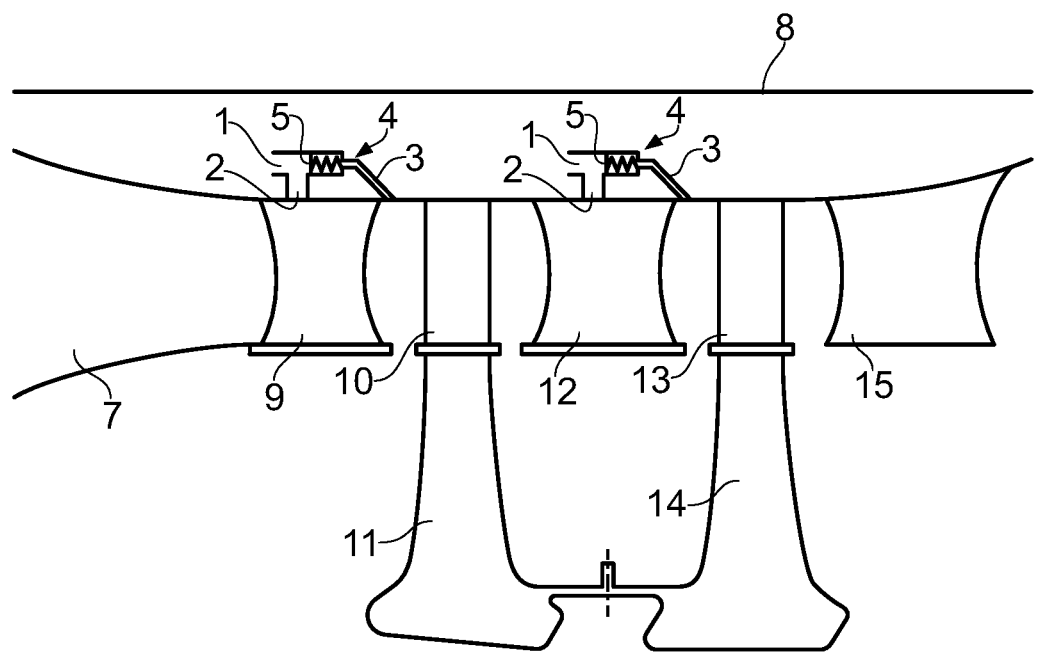
FIG. 1 shows a vane cooling system for a gas turbine engine as is known from the prior art.

FIG. 1 has been described in more detail above.

Figure 2:
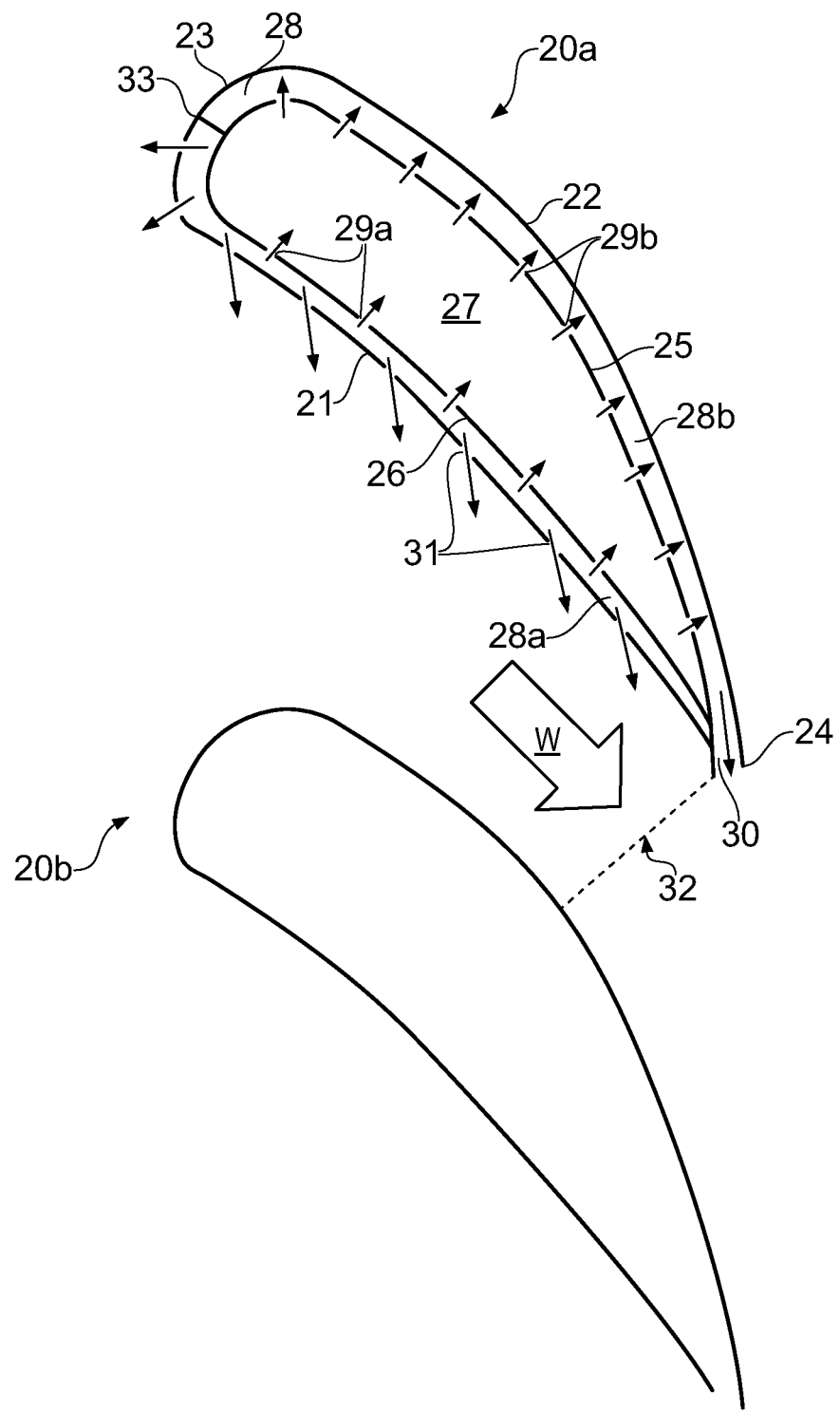
FIG. 2 shows a novel vane of an embodiment of a vane cooling system in accordance with the present disclosure during a low power engine operation.

FIG. 2 shows a cross section of the vane which comprises part of a vane cooling system illustrated in FIG. 4 and is described in more detail below. As can be seen, the hollow vane 20a is one of a circumferential array of vanes which include vane 20a and circumferentially adjacent vane 20b. For clarity and simplicity, detail is only shown for one vane 20a, though other vanes in the array may be similarly configured. The hollow vane 20a has a substantially aerofoil shaped cross section comprising a concave pressure side wall 21 and a convex suction side wall 22 which meet at a leading edge 23 and a trailing edge 24. A restrictor plate 25, 26 forms a loop within the aerofoil dividing a central cavity into an inner chamber 27 and a wall-side chamber 28. The pressure side 26 and suction side 25 of the restrictor plate are perforated with through-holes 29a, 29b. The through-holes 29a, 29b are arranged to serve as impingement cooling holes for cooling inwardly facing surfaces of the pressure side wall 21 and suction side wall 22. The wall-side chamber 28 is in fluid communication with one or more outlets 30 arranged along or adjacent the trailing edge 24. The pressure side wall 21 is provided with a number of outlets 31. The outlets 30, 31 are arranged generally to direct air to join a working fluid flow W which passes between the vanes 20a, 20b exiting through a throat 32. A separator 33 arranged adjacent the leading edge 23 separates two sides 28a, 28b of the wall-side chamber 28.

Air flows through the chambers 27, 28 are represented by the arrows. In FIG. 2, the air flows shown are representative of flow during a cruise operation of a gas turbine engine of which the vane cooling system is a component. During the cruise operation, cooling air is provided from a single inlet (see FIG. 4) through which the wall-side chamber 28 is fed on the pressure surface side 28a.

In the absence of a feed to the inner chamber 27, air entering the pressure surface side of the wall-side chamber 28a is drawn into the inner chamber 27 through through-holes 29a, and into the suction surface side of the wall-side chamber through through-holes 29b where it impinges on an inwardly facing surface of suction side wall 22 exits through trailing edge outlet 30 and joins the work fluid flow W at the throat 32. Air also exits through outlets 31 which may be configured and arranged to provide a film cooling effect on the outwardly facing surface of the pressure side wall 21.

Figure 3:
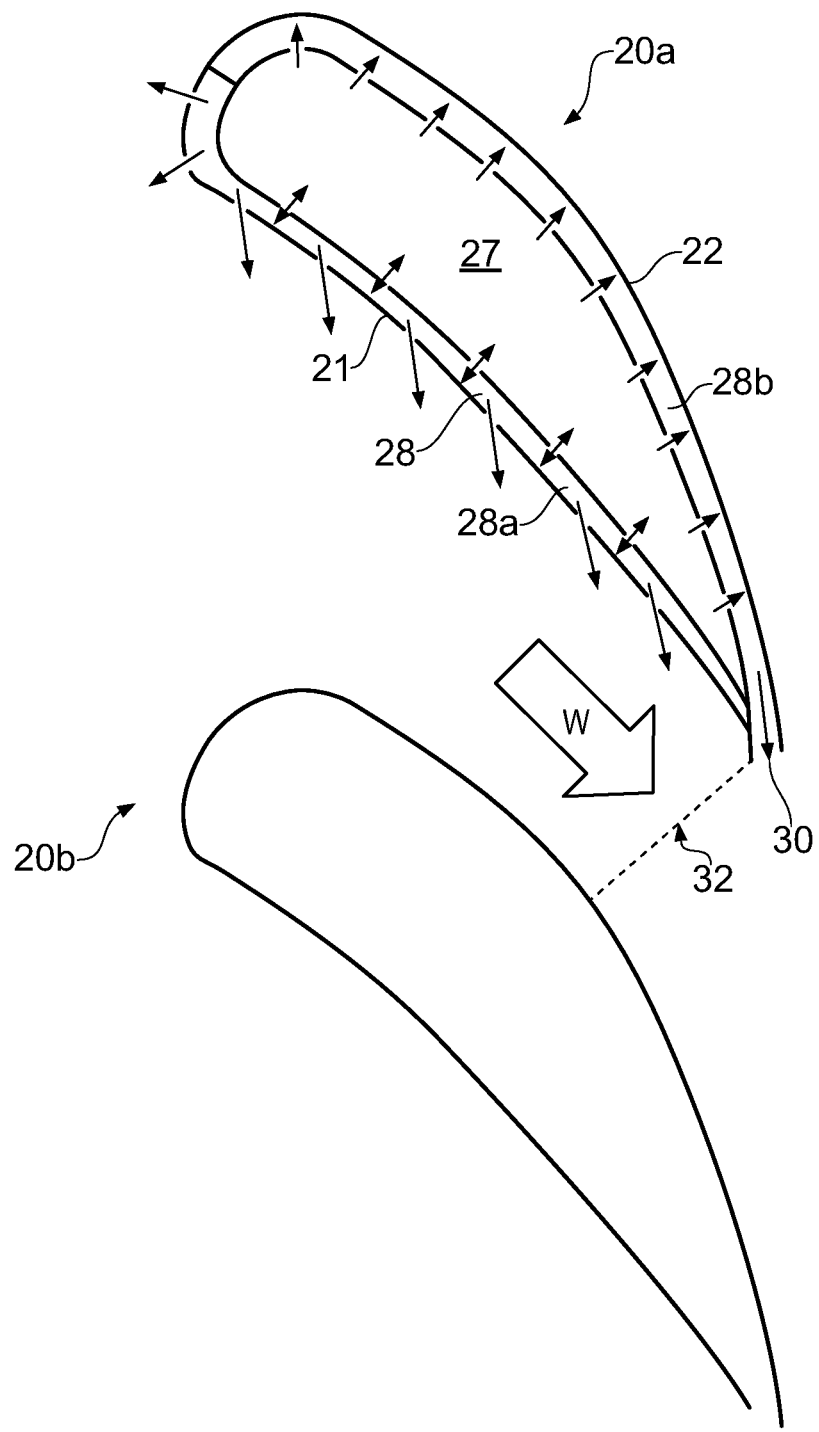
FIG. 3 shows the vane of FIG. 2 during a high power operation.

FIG. 3 shows the vane of FIG. 2 during a higher power operation. The air flows shown are representative of flow during a MTO operation of a gas turbine engine of which the vane cooling system is a component. During the MTO operation, cooling air is fed via a first inlet into a wall-side chamber 28 on the pressure surface side 28a as described in relation to FIG. 2. In addition, a top-up flow is fed via a second inlet into the inner chamber 27.

In the absence of a feed to the suction surface side of the wall-side chamber 28b, air entering the inner chamber 27 is drawn into the suction surface side of the wall-side chamber 28b through through-holes 29b. On further introduction of the top up flow, the pressure in the inner chamber 27 exceeds that in the pressure surface side of the wall-side chamber 28a and a counter-flow enters the pressure surface side of the wall-side chamber 28a from the inner chamber 27 through through-holes 29a. This provides an impingement cooling effect on an inwardly facing surface of the pressure side wall 21.

Spent cooling air exits the suction surface side of the wall-side chamber 28b through trailing edge outlets 30 and joins the work fluid flow W at or near the throat 32. Air also exits the pressure surface side of the wall-side chamber 28a through outlets 31 in the pressure side wall 21. The outlets 31 may be configured and arranged to provide a film cooling effect on the outwardly facing surface of the pressure side wall 21. It is to be noted that the outlets 31 are out of alignment with the through-holes 29a. This ensures a more even cooling along the pressure side wall 21.

Figure 4:
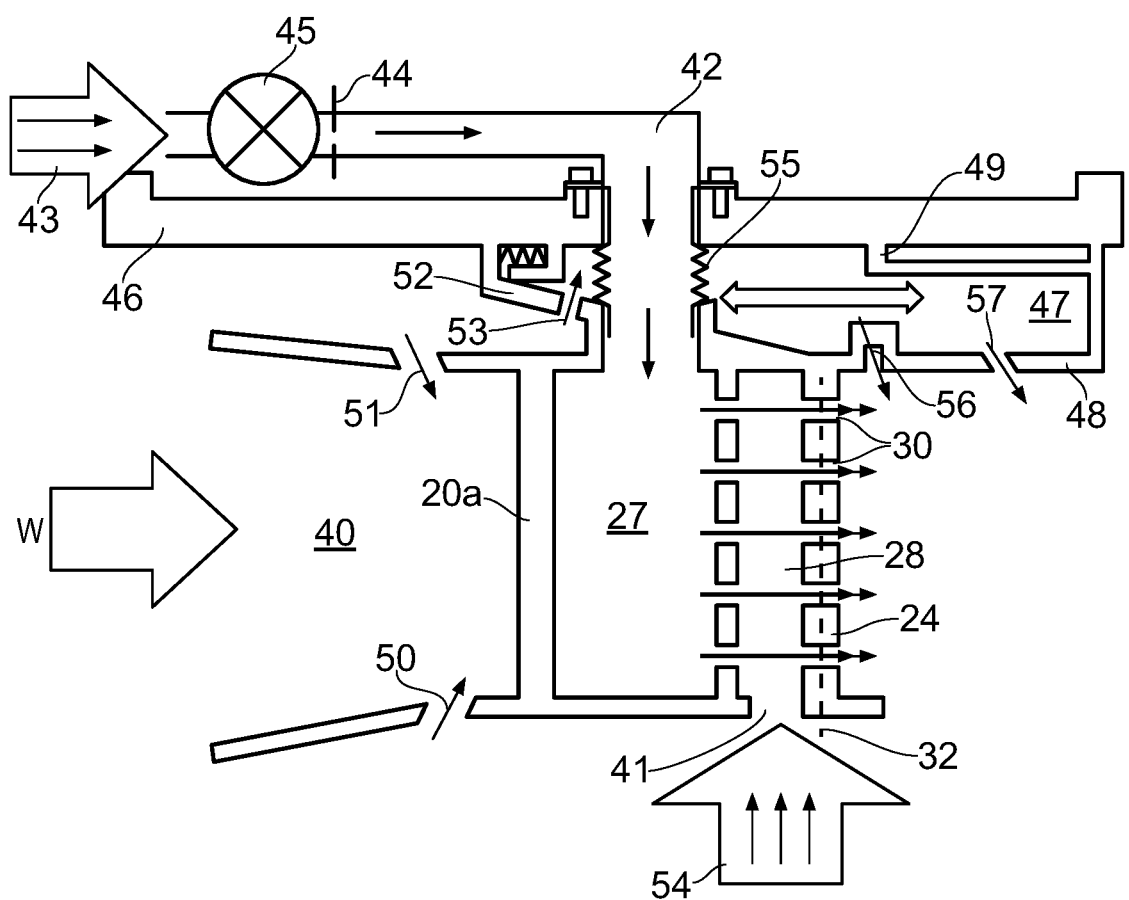
FIG. 4 shows a side view of the vane cooling system comprising the vane of FIGS. 2 and 3.

FIG. 4 shows a side view of an embodiment of a vane cooling system in accordance with the present disclosure, the vane cooling system incorporates vanes of the configuration already shown in FIGS. 2 and 3 and described above.

As can be seen the vane 20a spans an annulus 40 of a gas turbine engine the vane which has a radially inner inlet 41 which feeds the wall-side chamber 28 and a radially outer inlet 42 which feeds the inner chamber 27. Along a trailing edge of the vane is an array of outlets 30 opening through the vane 20a and directed in line with a flow of working fluid W flowing through the annulus 40. Axially upstream of the vane 20a (with respect to the direction of flow W of the working fluid), is a compressor (not shown). A first feed 43 is tapped from the compressor upstream. The feed 43 is arranged in fluid communication with the radially outer inlet 42. The feed 43 entering the radially outer inlet 42 may be controlled by means of a flow restrictor 44 obstructing a path of the feed 43 to the inlet 42. The feed 43 may be opened or closed or have its flow adjusted by means of valve 45. The inlet 42 passes through an annular casing 46 into the inner chamber 27 crossing an axially extending annular cavity 47. Downstream of the vane 20a, the axially extending annular cavity 47 is bounded on a radially inward side and an axially downstream side by a segmented ring 48. Segments of the segmented ring 48 are suspended from the casing 46 by means of suspension hooks 49.

Rear inner 50 and rear outer 51 discharge flows are drawn into the annulus 40 to join the working fluid flow W. A flow may pass through a sloped bulk head 52 via one or more orifices 53.

A second feed 54 supplies the radially inner inlet 41. The feed 54 is open during both high power and low power operations. During a cruising operation the valve 45 to first feed 43 may be closed or positioned to allow a restricted fixed flow. During a higher power operation such as maximum take-off, the valve 45 is opened allowing the flow in the inner chamber 27 to be topped up with air from feed 43. The valve 45 may be adjustable to provide an optimum flow for the operating condition.

An air transfer device 55 decouples the feed 43 from flow in the axially extending annular cavity 47. A constant pressure can thus be maintained in the cavity 47. A pressure differential downstream of the vane throat 32 draws a portion of air in the cavity 47 back into the working fluid flow W in the annulus 40 via a gap 56 between a chordal seal and the segmented ring 48, and a gap 57 between/through the seal segments.

Figure 5:
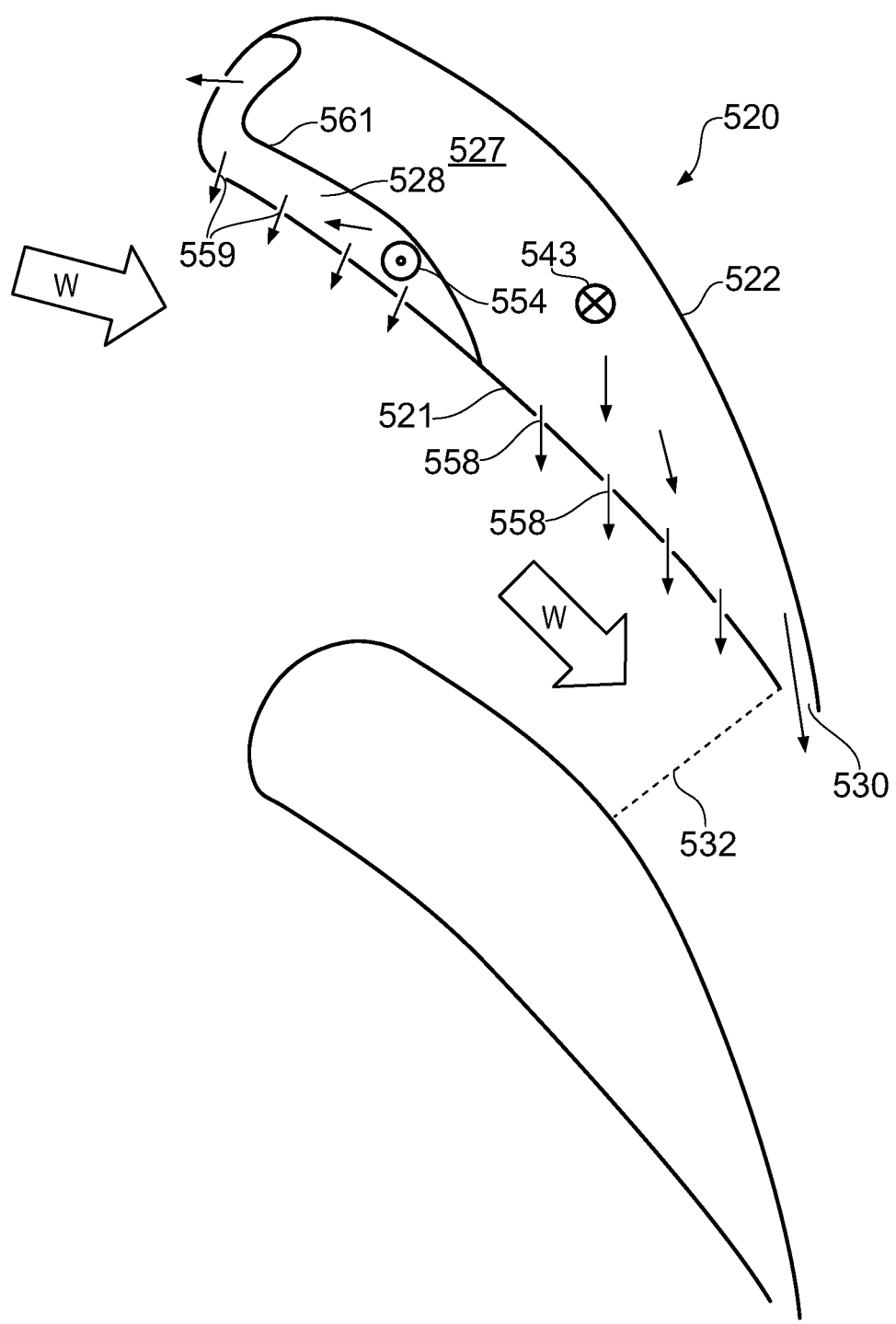
FIG. 5 shows a second embodiment during a higher power operation.

FIG. 5 shows an alternative embodiment during a higher power operation. The air flows shown are representative of flow during a MTO operation of a gas turbine engine of which the vane 520 cooling system is a component. During the MTO operation, cooling air 554 is fed via a first inlet into a wall-side chamber 528 on the pressure surface side wall 521. In addition, a top-up flow 543 (typically at lower pressure) is fed via a second inlet into the larger chamber 527.

Air entering the larger chamber 527 is drawn spanwise through the vane 520 and exits through cooling holes 558 provided in the pressure surface side wall 521 where it joins a main work fluid flow W. A portion also exits through trailing edge outlet 530 and joins the work fluid flow W at or near the throat 532. Air 554 entering the wall side chamber 528 is drawn spanwise through the chamber 528 and exits through cooling holes 559 where it is swept up with the work fluid flow W.

The outlets 558, 559 may be configured and arranged to provide a film cooling effect on the outwardly facing surface of the pressure side wall 521.

Figure 6:
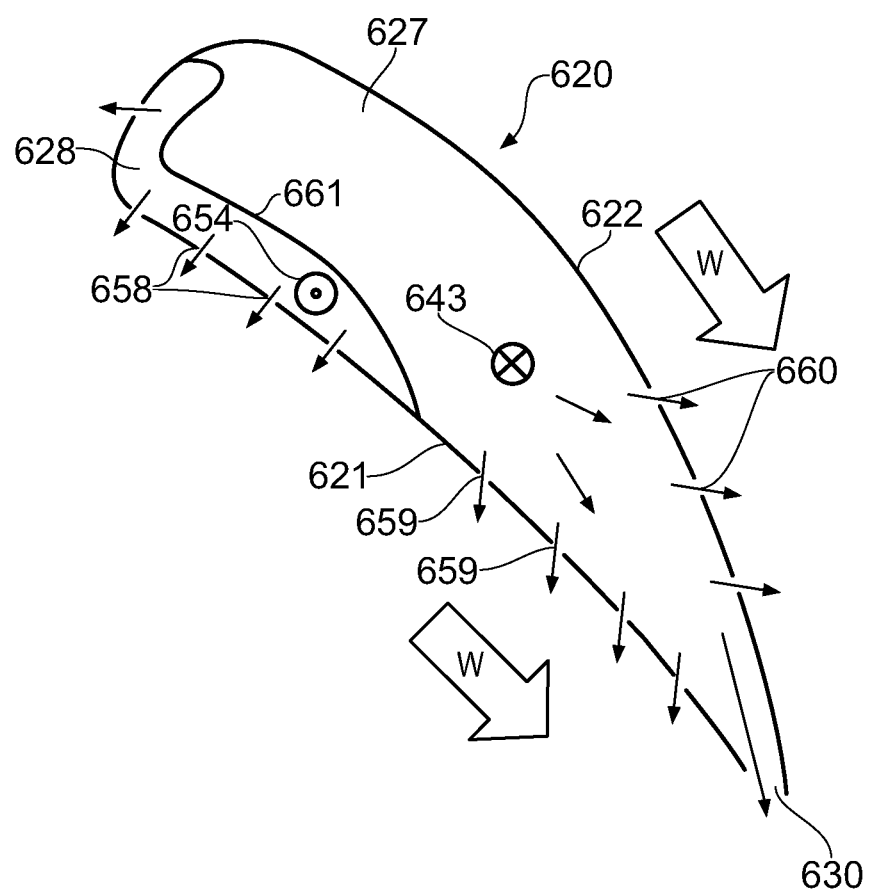
FIG. 6 shows a third embodiment during a higher power operation.

FIG. 6 shows a third embodiment during a higher power operation. The air flows shown are representative of flow during a MTO operation of a gas turbine engine of which the vane 620 cooling system is a component. During the MTO operation, cooling air 654 is fed via a first inlet into a wall-side chamber 628 on the pressure surface side wall 621. In addition, a top-up flow 643 (typically at lower pressure) is fed via a second inlet into the larger chamber 627.

Air entering the larger chamber 627 is drawn spanwise through the vane 620 and exits through cooling holes 659 provided in the pressure surface side wall 621 where it joins a main work fluid flow W on a pressure side of the vane 620 and may also pass through cooling holes 660 where it joins a main work fluid flow W on a suction surface side of the vane 620. A portion also exits through trailing edge outlet 630 and joins the work fluid flow W at or near the throat 632. Air 654 entering the wall side chamber 628 is drawn spanwise through the chamber 628 and exits through cooling holes 658 where it is swept up with the work fluid flow W on a pressure surface side 621 of the vane 620.

The outlets 658, 659 and 660 may be configured and arranged to provide a film cooling effect on the outwardly facing surface of the pressure side wall 621 and the suction side wall 622.

Figure 7:
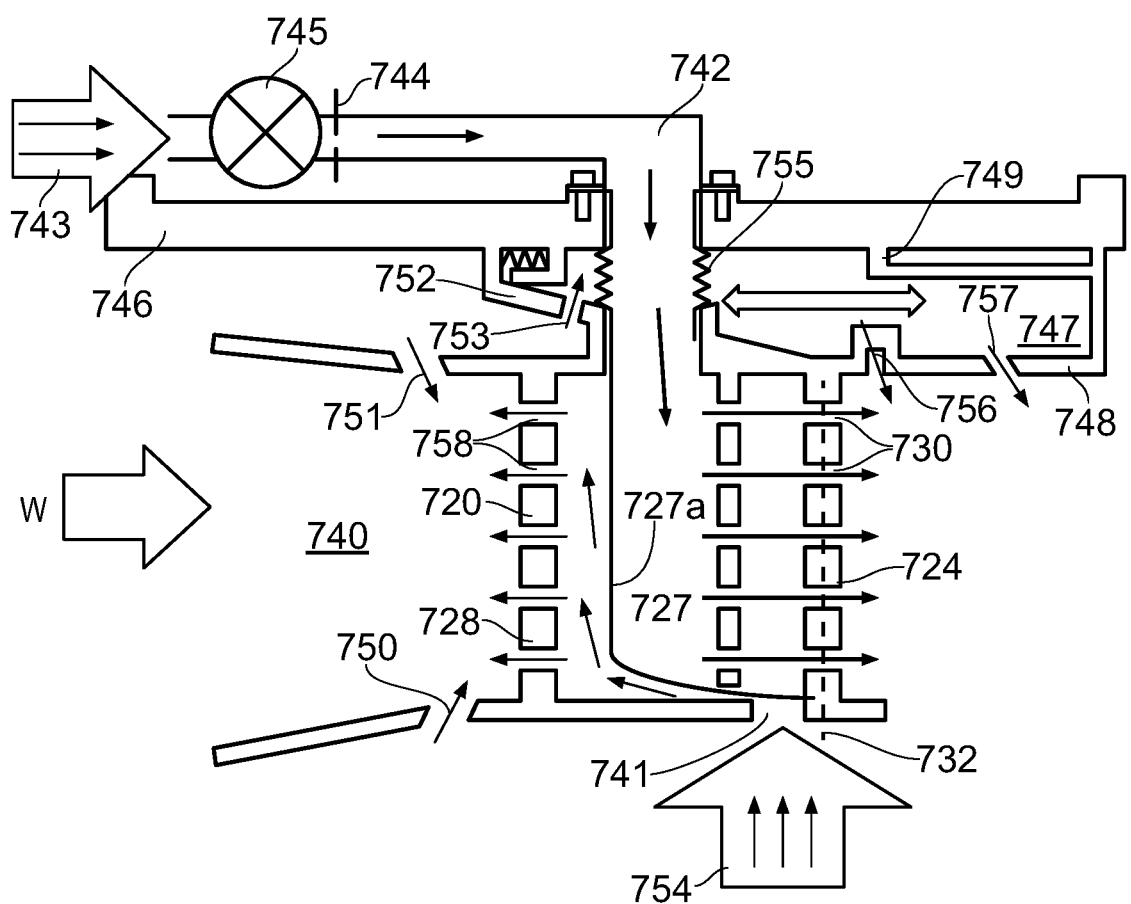
FIG. 7 shows a side view of a vane cooling system that incorporates vanes of the configuration shown in FIGS. 5 and 6.

FIG. 7 shows a side view of an embodiment of a vane cooling system in accordance with the present disclosure, the vane cooling system incorporates vanes of the configuration already shown in FIGS. 5 and 6 and described above.

As can be seen the vane 720 spans an annulus 740 of a gas turbine engine. The vane has a central cavity which is divided by wall 727a to produce a first chamber 728 and a second chamber 727. The vane 720 has a radially inner inlet 741 which feeds the first chamber 728 and a radially outer inlet 742 which feeds the second chamber 727. Air exits the first chamber 728 through cooling holes 758. Along a trailing edge of the vane 720 is an array of outlets 730 opening through vane 720 and directed in line with a flow of working fluid W flowing through the annulus 740. Axially upstream of the vane (with respect to the direction of flow W of the working fluid), is a compressor (not shown). A first feed 743 is tapped from the compressor upstream. The feed is arranged in fluid communication with the radially outer inlet 742. The feed 743 entering the radially outer inlet 742 may be controlled by means of a flow restrictor 744 obstructing a path of the feed 743 to the inlet 742. The feed 743 may be opened or closed by means of valve 745. The inlet 742 passes through an annular casing 746 into the larger chamber 727 crossing an axially extending annular cavity 747. Downstream of the vane 720, the axially extending annular cavity 747 is bounded on a radially inward side and an axially downstream side by a segmented ring 748. Segments of the segmented ring 748 are suspended from the casing 746 by means of suspension hooks 749.

Rear inner 750 and rear outer 751 discharge flows are drawn into the annulus 740 to join the working fluid flow W. A flow may pass through a sloped bulk head 752 via one or more orifices 753.

A second feed 754 supplies the radially inner inlet 741. The feed is open during both high power and low power operations. During a cruising operation the valve 745 to first feed 743 may be closed. During a higher power operation such as maximum take-off, the valve 745 is opened allowing the flow in the larger chamber 727 to receive air from feed 743. The valve 745 may be adjustable to provide an optimum flow for the operating condition. The air exits the larger chamber through outlets 730 in the trailing edge 724 as well as through film cooling holes provided in one or both of the pressure side and wall side of the vane (not shown).

An air transfer device 755 decouples the feed 743 from flow in the axially extending annular cavity 747. A constant pressure can thus be maintained in the cavity 747. A pressure differential downstream of the vane throat 732 draws a portion of air in the cavity 747 back into the working fluid flow W in the annulus 740 via a gap 756 between a chordal seal and the segmented ring 748, and a gap 757 between/through the seal segments.

It will be understood that the invention is not limited to the embodiments above-described and various modifications and improvements can be made without departing from the invention as is defined by the appended claims. Except where mutually exclusive, any of the features may be employed separately or in combination with any other features and the disclosure extends to and includes all combinations and sub-combinations of one or more features described herein.

The invention claimed is:

1. A vane cooling system for a gas turbine engine, the system comprising;
    a vane arranged on a stator and having a chamber extending continuously from a radially inner end to a radially outer end of the vane,
    the vane having a first inlet and a second inlet;
    a first cooling fluid feed in communication with the first inlet,
    a second cooling fluid feed in communication with the second inlet,
    the first cooling fluid feed having a higher pressure than the second cooling fluid feed, the first cooling fluid feed having a constant flow,
    a flow adjustment device arranged for adjusting a flow of the second cooling fluid feed into the second inlet, the flow adjustment device operable to adjust flow of the second cooling fluid feed independently of the flow of the first cooling fluid feed, whereby to provide a top-up cooling flow to the chamber,
    wherein the chamber is divided by a plate to provide a main chamber and a wall-side chamber bordering the inner chamber, the first inlet enters the wall-side chamber and the second inlet enters the main chamber, and wherein the plate is configured to permit a restricted flow of air between the main chamber and the wall-side chamber.

2. The vane cooling system as claimed in claim 1 wherein the first inlet is arranged at a radially inner end of the vane.

3. The vane cooling system as claimed in claim 1 wherein the second inlet is arranged at a radially outer end of the vane.

4. The vane cooling system as claimed in claim 1 wherein the vane is provided with multiple outlets for one or both of the first cooling fluid feed and the second cooling fluid feed.

5. The vane cooling system as claimed in claim 4 wherein outlets are provided as an array of holes arranged along or adjacent a trailing edge of the vane.

6. The vane cooling system as claimed in claim 4 wherein outlets are provided as an array of holes in a pressure side wall of the vane.

7. The vane cooling system as claimed in claim 4 wherein the outlets are configured to direct the spent cooling fluid into a working fluid passing through an annulus in which the vane sits.

8. The vane cooling system as claimed in claim 1 wherein the vane has an aerofoil shape in cross-section, the aerofoil shape defined by a pressure side wall and a suction side wall which meet one another at a leading edge and a trailing edge and the plate extends from a trailing edge end of the pressure side wall spaced from but substantially in parallel alignment with the pressure side wall, turns in parallel with the leading edge and continues to extend spaced from but substantially in parallel alignment with the pressure side wall to intercept itself whereby to form an outer perimeter of the inner chamber and an inner perimeter of the wall-side chamber.

9. The vane cooling system as claimed in claim 8 wherein the plate is perforated with a number of through holes and the total cross-section of the through holes is selected to restrict a flow of air passing between the chambers.

10. The vane cooling system as claimed in claim 1 wherein the vane has an aerofoil shape in cross-section, the aerofoil shape defined by a pressure side wall and a suction side wall which meet one another at a leading edge and a trailing edge and the plate extends along a portion of the pressure side wall to a position along the leading edge and wherein the pressure side wall is perforated with a first array of outlet holes exiting the main chamber and a second array of outlet holes exiting the exiting the wall side chamber.

11. The vane cooling system as claimed in claim 10 wherein the suction side wall is provided with an array of outlet holes which are directed towards a throat between adjacent vanes.

12. The vane cooling system as claimed in claim 8 wherein the plate comprises a different material than that of the pressure side wall and suction side wall.

13. The vane cooling system as claimed in claim 1 wherein the plate is bonded to a wall of the vane using a cast bonding method.

14. The vane cooling system as claimed in claim 1 wherein the plate is perforated with a number of through-holes.

15. A gas turbine engine comprising a turbine section, the turbine section comprising a vane cooling system comprising:
    a vane arranged on a stator and having a chamber extending continuously from a radially inner end to a radially outer end of the vane,
    the vane having a first inlet and a second inlet;
    a first cooling fluid feed in communication with the first inlet, a second cooling fluid feed in communication with the second inlet, the first cooling fluid feed having a higher pressure than the second cooling fluid feed, the first cooling fluid feed having a constant flow, a flow adjustment device arranged for adjusting a flow of the second cooling fluid feed into the second inlet, the flow adjustment device operable to adjust flow of the second cooling fluid feed independently of the flow of the first cooling fluid feed, whereby to provide a top-up cooling flow to the chamber, wherein the chamber is divided by a plate to provide a main chamber and a wall-side chamber bordering the inner chamber, the first inlet enters the wall-side chamber and the second inlet enters the main chamber, and wherein the plate is configured to permit a restricted flow of air between the main chamber and the wall-side chamber.

16. The gas turbine engine as claimed in claim 15 comprising a compressor upstream of the vane cooling system and wherein the first and second cooling fluid feeds tap air from the compressor.

17. The gas turbine engine as claimed in claim 16 wherein the first cooling fluid feed taps air from a different section of the compressor to that from which the second cooling fluid feed taps air.

18. The gas turbine engine as claimed in claim 15 wherein the engine has a first operating condition and a second operating condition, wherein the first cooling fluid feed is constant during the first and second operating conditions and the flow adjustment device is operable to adjust flow of the second cooling fluid feed responsive to the engine commencing the second operating condition.

19. The vane cooling system as claimed in claim 18 wherein the total cross-section of through-holes is selected to restrict a flow of air passing between the chambers.

\* \* \* \* \*